(No Model.) 3 Sheets—Sheet 1.
J. HARRIS & J. LUCAS.
SELF BINDING HARVESTER.

No. 322,931. Patented July 28, 1885.

Witnesses.
F. B. Fetherstonhaugh
Lewis Tomlinson

Inventors.
John Harris
Josiah Lucas
by Donald C. Ridout
Attorneys

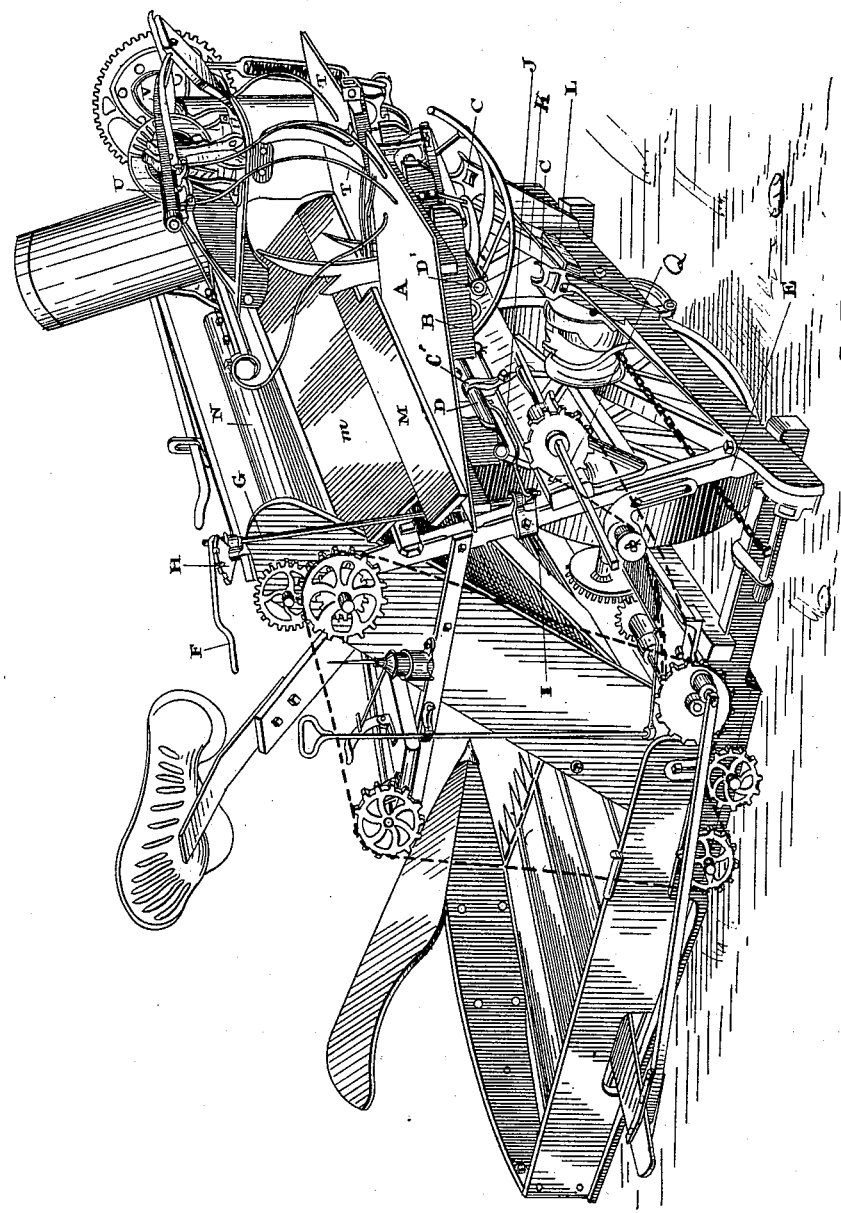

(No Model.)  3 Sheets—Sheet 3.

J. HARRIS & J. LUCAS.
SELF BINDING HARVESTER.

No. 322,931. Patented July 28, 1885.

Witnesses.
F. B. Fetherstonhaugh
Lewis Tomlinson

Inventors.
John Harris
Josiah Lucas
by Donald J. Ridout & Co.
Attorneys

UNITED STATES PATENT OFFICE.

JOHN HARRIS AND JOSIAH LUCAS, OF BRANTFORD, ONTARIO, CANADA.

SELF-BINDING HARVESTER.

SPECIFICATION forming part of Letters Patent No. 322,931, dated July 28, 1885.

Application filed July 31, 1883. (No model.) Patented in Canada October 10, 1883, No. 17,849.

*To all whom it may concern:*

Be it known that we, JOHN HARRIS, manufacturer, and JOSIAH LUCAS, mechanic, both of the city of Brantford, in the county of Brant, in the Province of Ontario, Canada, have jointly invented certain new and useful Improvements in Self-Binding Harvesters; and we do hereby declare that the following is a full, clear, and exact description of the same.

The object of the invention is to construct a self-binding harvester which can readily be reduced in width for the purpose of enabling it to pass through gates and other passage-ways of a less width than that of the machine when working; and it consists, essentially, in hinging the frame carrying the binding-table and mechanism, and arranging the connections therewith in such a manner that the entire binding mechanism may be folded up and held there, so as to reduce the width of the machine, substantially as hereinafter specified.

Figure 1:
Figure 5:
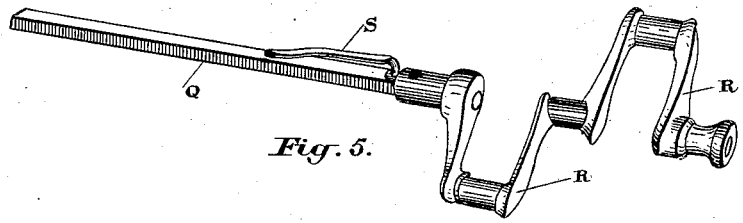
Figure 4:
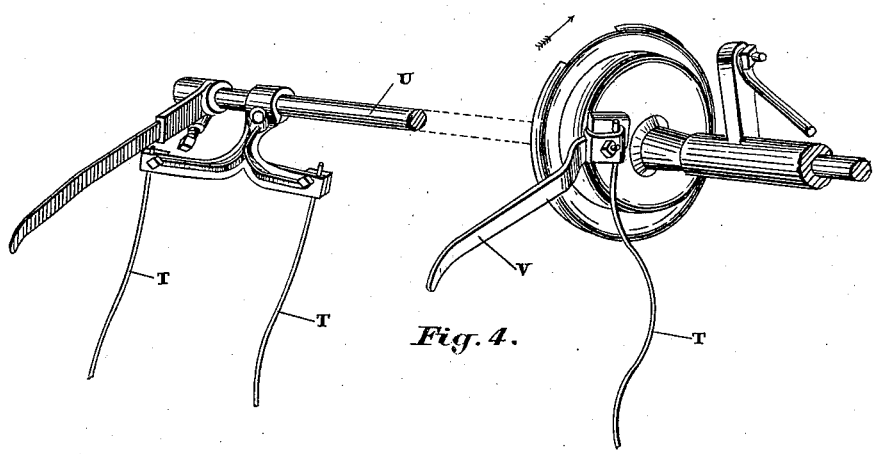
Figure 3:
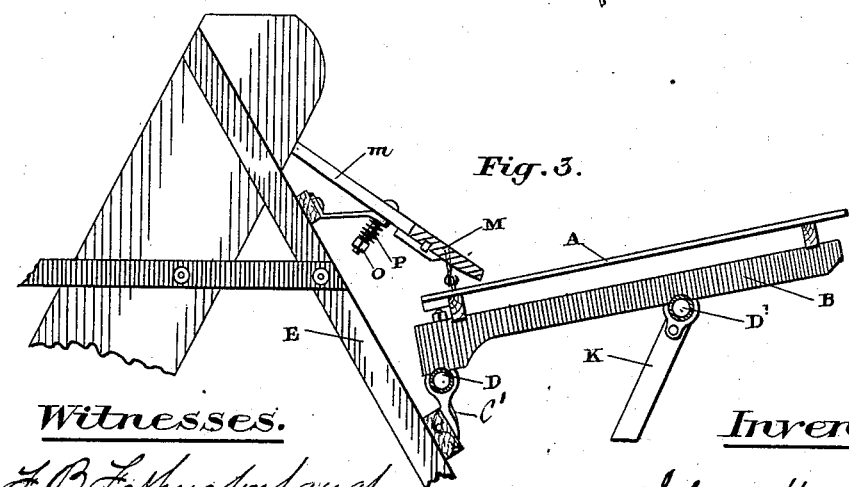

Figure 1 is a perspective view of a self-binding harvester, showing the table and mechanism extended out ready for work. Fig. 2 is a similar view of a self-binding harvester, but showing the table and binding attachments folded up so as to reduce the width of the machine. Fig. 3 is a sectional detail showing the construction of our hinged frame for carrying the binding-table and mechanism. Fig. 4 is a perspective detail showing the fingers attached to the knotter-shaft and head for the purpose of retaining the loose grain while the sheaf is being bound. Fig. 5 is a perspective detail of the packer-cranks, showing the manner of connecting the shaft.

In practice we have found that to arrange the binding-table and mechanism so that the same can be folded up to reduce the width of the machine about nine inches is sufficient for our purpose, and we have therefore illustrated a machine showing no more than that reduction in width. At the same time the manner in which we have arranged the mechanism to accomplish this end is such that it may without any material alteration be arranged to fold the binding-table and mechanism to a much greater extent; but for the purpose of this specification it is not necessary to submit other illustrations than those we have prepared.

In the drawings like letters of reference indicate corresponding parts in each figure.

A is the binding-table, attached to and supported by the sills B. The binding mechanism is supported entirely by the frame carrying the binding-table, which frame is carried on the pipes or rods D D', and is supported in suitable brackets, C C', attached to the main frame E of the harvester. On the front end of this binder-frame is the usual train of gearing for communicating motion from the packer crank-shaft Q to the knotter-shaft and mechanism. This train of gearing is mounted upon and moves with the binder-table, the latter of which, with the rods D D', may be moved longitudinally on the brackets C C', so as to adjust the binding mechanism and bring it opposite to any desired point to accommodate any variation in the length of the grain being cut. This adjustment is accomplished by the driver through the agency of the hand-lever F, which is attached to the vertical rod G, and is arranged in connection with the quadrant H so that the binding mechanism may be held in the desired position, the bottom end of the rod G being provided with a crank, I, which is suitably connected to the pipe D by the rod J.

On reference to Fig. 3 the exact construction of the binding-table will be seen. In this figure the table is shown folded up, the arm K being set so as to form a support to the table. For want of space on the paper we have shown the arm broken; but it will be seen on reference to Fig. 2 that it rests within and is held in place by the bracket L, fixed to the frame of the harvester, the upper end of the arm being pivoted or journaled on the pipe D'.

M is a slanting board attached to the table A, and butting against the bottom edge of the slanting board *m*, which latter slanting board extends from the top edge of the slanting board M to the conveying-apron N. The slanting board *m* is fastened to the frame of the harvester, while the slanting board M, being attached to the table A, moves with it when the latter is adjusted for the purpose hereinbefore explained. Consequently the slanting board M constitutes a portion of the grain-table A, while the slanting board *m* constitutes an independent chute, secured to the harvester and extending from the conveying-apron to the binding-table. The board *m* is secured to the main frame in any suitable manner, and as it has but a very slight movement imparted thereto upon the folding of the table A, it will have sufficient play to allow a slight yielding of the same in an upward direction when said folding takes place.

In order to permit the table A to be folded up without running the risk of breaking or otherwise injuring the slanting boards M m, we place on the bolts O, which hold the slanting board m down, a spiral spring, P, which is sufficiently strong to hold the board in position and yet will permit it to give a little upwardly in the event of the table A striking against it.

Although we have shown in Fig. 3 only one bolt, it will of course be understood that as many as required may be employed. As the portion of the packer-shaft marked Q, which derives its motion from the harvester, is held in a bracket attached to the frame of the harvester, while the packer-cranks R are hinged in the sills B, it is necessary to devise an easy plan for disconnecting the two. In Fig. 5 we exhibit the plan we have adopted for that purpose. In that figure it will be seen that the packer-shaft Q is made square and fits into a socket formed in the hub of the packer-crank R.

A spring, S, is riveted to the packer-shaft Q, its end being bent and pointed so as to fit into a hole made either in the hub of the packer-crank R or in a lug attached thereto. When the end of the spring fits into this hole the connection between the shaft Q and crank R is complete, whereas by simply lifting the spring out of the hole the shaft may be withdrawn from the hub of the crank, when the crank will be independent of the shaft and may be folded with the table.

Although the principal object of our invention is to devise a machine which will fold up as described, we have also made an improvement in the binding mechanism. The said improvement consists in providing fingers T, attached to the knotter-shaft U. These fingers extend from the knotter-shaft to the binding-table A, and are intended to retain the loose grain while the sheaf is being formed. These fingers are attached to the knotter-shaft and knotter-head, as indicated in Fig. 4, and of course revolve with the knotter-shaft when it is in motion. They therefore do not obstruct the discharge of the bundle, which is thrown out by the kicker V, the shaft revolving, as usual, in the direction indicated by arrow.

What we claim as our invention is—

1. In a self-binding harvester, the binding-table A, hinged at one side to the main frame, and provided with the usual binding attachments and carrying the knotter mechanism, in combination with the brackets C' C, the former pivotally connected with the table and supporting the inner side thereof, the latter rigidly connected with the main frame, and serving as supports for the outer end of said table when in a normal position, the parts being constructed, arranged, and operating substantially as and for the purpose specified.

2. In combination with the rods D D', supporting the binding-table, its attachments, and the knotter mechanism, the brackets C C', the former having the frame-rod D of the binding-table sleeved therein, and the latter rigidly connected to the main frame to receive and support the rod D' when the binding-table is in a normal position, as and for the purposes set forth.

3. In a self-binding harvester in which the binding-table is hinged to the elevator-frame below an independent table secured to the elevator-frame, and extending from the binder-table to the conveying-apron, one or more bolts arranged to hold down the independent table, in combination with springs, as specified, so as to permit a slight upward movement of the independent table during the folding up of the binding-table.

4. In a self-binding harvester in which the frame carrying the binding mechanism is hinged to the harvester, the divided packer-shaft, one portion thereof carried by the harvester and the other portion carried by the hinged binder-frame, a socket formed in the end of that portion carried by the binder-frame to receive the end of that portion of the packer-shaft carried by the harvester, in combination with a spring attached to that portion of the shaft on the harvester and arranged to engage with the portion on the binder-frame, substantially as and for the purpose specified.

5. In a self-binding harvester in which the frame carrying the binding mechanism is hinged to the main frame of the harvester and adapted to be folded up to reduce the width of the harvester, the brackets C' C, arranged to support the said frame in its normal position, in combination with an arm pivoted on the bottom of the binder-frame and arranged to support the frame when folded up, substantially as described.

6. In a self-binding harvester, the folding table A, the brackets C' C, rigidly attached to the main frame, the rods D D', carrying the binding-table, its attachments, and the knotter mechanism, the rod D, pivotally mounted within the brackets C', to permit the folding of the parts carried thereby, in combination with a cranked lever to impart a longitudinal movement to said rod D, as and for the purposes set forth.

7. In a self-binding harvester, one or more fingers attached rigidly to the main binder-shaft, which operates the knotter and carries the ejector-fingers for the purpose of retaining loose grain while the sheaf is being formed.

Brantford, July 12, 1883.

JOHN HARRIS.
JOSIAH LUCAS.

In presence of—
F. C. TUTTLE,
H. WHITAKER.